United States Patent
Li et al.

(10) Patent No.: US 8,291,403 B2
(45) Date of Patent: Oct. 16, 2012

(54) INSTALL-UNIT UPGRADE USING DYNAMIC CONFIGURATION DATA MANIPULATION AND MERGING

(75) Inventors: Wei Liang Li, Beijing (CN); Nidhi Yajnik, Rajasthan (IN); Shu Guang Yan, Beijing (CN); Prasanna Kulkarni, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 1143 days.

(21) Appl. No.: 12/164,789

(22) Filed: Jun. 30, 2008

(65) Prior Publication Data

US 2009/0328024 A1 Dec. 31, 2009

(51) Int. Cl.
*G06F 9/44* (2006.01)

(52) U.S. Cl. ......... 717/168; 717/169; 717/121; 709/220

(58) Field of Classification Search .......... 709/220–226; 717/117, 120–123, 136–137, 168–173, 174–178
See application file for complete search history.

(56) References Cited

U.S. PATENT DOCUMENTS

| | | | |
|---|---|---|---|
| 6,026,438 A | 2/2000 | Piazza et al. | |
| 6,615,255 B1 | 9/2003 | Blaszczak | |
| 6,823,376 B1 | 11/2004 | George et al. | |
| 6,848,078 B1 * | 1/2005 | Birsan et al. | 715/206 |
| 6,947,943 B2 | 9/2005 | DeAnna et al. | |
| 7,024,471 B2 | 4/2006 | George et al. | |
| 7,162,509 B2 | 1/2007 | Brown et al. | |
| 7,386,835 B1 * | 6/2008 | Desai et al. | 717/117 |
| 7,389,219 B2 | 6/2008 | Loisey et al. | |
| 7,398,524 B2 * | 7/2008 | Shapiro | 717/175 |
| 7,506,127 B2 | 3/2009 | Reger et al. | |
| 7,606,889 B1 * | 10/2009 | Kundala et al. | 709/223 |
| 7,661,106 B1 * | 2/2010 | Ankireddipally et al. | 718/101 |
| 2003/0023707 A1 * | 1/2003 | Ryan | 709/220 |
| 2007/0113186 A1 * | 5/2007 | Coles et al. | 715/735 |
| 2007/0276850 A1 * | 11/2007 | Bhattacharya et al. | 707/101 |

* cited by examiner

*Primary Examiner* — Lewis A Bullock, Jr.
*Assistant Examiner* — Tina Huynh
(74) *Attorney, Agent, or Firm* — Rory D. Rankin; Meyertons, Hood, Kivlin, Kowert & Goetzel, P.C.

(57) ABSTRACT

A system and method for efficient upgrading of computing system software. A computing system includes clients and one or more servers coupled to a network. Cluster server software allows the clients and server(s) to work together as a cluster. This software is platform- and version-specific depending on the customer. Each customer has a customized configuration with customer-dependent edits performed on the original configuration. When a new-release configuration is made available, the three configurations are translated to abstract object trees. A series of predetermined abstract operations are preformed on the abstract object trees in order to generate a target abstract object tree. The target abstract object tree is translated to a target file, wherein the target file includes the common portions between the original and new-release configurations and the merged upgrades of the customized and new-release configurations.

17 Claims, 8 Drawing Sheets

INSTALL-UNIT UPGRADE USING DYNAMIC CONFIGURATION DATA MANIPULATION AND MERGING

BACKGROUND OF THE INVENTION

1. Field of the Invention

This invention relates to computer systems, and more particularly, to efficient methods and mechanisms for upgrading computing system software.

2. Description of the Relevant Art

Computer clusters group computers together in order to improve performance and/or availability over that provided by a single computer. High-availability clusters are implemented primarily to provide high availability for critical business applications and data through system redundancy and failover. For example, a cluster may have redundant nodes, which are then used to provide service when system components fail. Each application provided by a cluster utilizes resources of a cluster such as a memory (perhaps a harddrive), an Internet Protocol (IP) address, a network name, and so forth. These resources may be moved from one server to another during failover without any dependence on a specific server.

Cluster server software is software designed to allow servers to work together as a computer cluster, which may be used to provide increased availability of applications through failover or to provide high-performance computing through parallel calculating power. For high-availability clusters, the cluster server software may constantly monitor the status of servers, networks, and applications to detect failures or performance degradation. Once detected, the software and can respond by automatically restarting a troubled application on designated backup hardware, while maintaining all network or storage connections in the process.

An upgrade of such software may provide challenges. Upgrade installation scripts may be provided within a module on a read-only memory such as a DVD-ROM. These modules contain product package upgrades and configuration file upgrades for the software. Some of these configuration files are customizable and the old versions may have been edited by the customer. In order for the cluster to remain stable after the upgrade, these customized portions of the configuration files need to be reserved On a machine-by-machine basis, a customer may need to obtain administrator access and execute the installation scripts within the update module. The execution of these scripts should overwrite configuration files to reflect the software updates without overwriting the customized portions.

In order to include coding of all the incremental changes required within all the previous installer scripts, the software designers may define a large matrix to track necessary changes. This matrix may be used to define an exact change list for all platforms (e.g. AIX, Linux, HP, Solaris, etc.), all versions (e.g. 4.0, 4.1, 5.0, etc.), and any other possible variables the product depends on. There may be a large amount of paths within the upgrade module to update between versions of the cluster software product. The number of paths may reach the hundreds depending on platforms, devices, and versions of the platforms and devices. In addition, this change list continues to require on-going updates before the release of the new cluster software product.

One solution to the on-going updates is to freeze the current state of updates, complete and deliver the upgrade module that includes the upgrade installer scripts, compose a new configuration file change list dependent on the customer and their system configuration being used, and hard code the changes into the installer scripts. The hard coding may be performed by the software designers and a new DVD-ROM may be delivered to the customer, or the hard coding may be done by the customer upon receiving documentation of the required changes to the installer scripts. However, this process incorporates human error, a large iterative upgrade loop, much communication between the customer and the software design team, test regression problems between incremental updates, and on-going evolving changes to paths that need maintenance during the iterative loop process.

If a change list could be generated automatically and an update of the configuration files could be performed automatically, in general, an upgrade of a cluster software product would be more efficient. The effort and time required by designers and customers would be greatly reduced. Also, if an automatic upgrade was platform and version independent, the required effort is further reduced. Additionally, the number of regression tests may be greatly reduced, which decreases risk.

In view of the above, efficient methods and mechanisms for upgrading computing system software are desired.

SUMMARY OF THE INVENTION

Systems and methods for efficient upgrading of computing system software are disclosed.

In one embodiment, a computer readable storage medium comprises program instructions configured to identify and possibly load configuration files for an original configuration, a customized configuration, and a new-release configuration. The customized configuration has files with lines added, deleted, or modified with respect to the original configuration by a customer. These edits are customer-specific. The new-release configuration has files with upgraded lines for all customers possessing the original configuration. In order to merge the new-release upgrades with customer-specific edits, the corresponding configurations are translated to abstract object trees by the program instructions.

Also contemplated are program instructions that perform a series of predetermined abstract operations on the abstract object trees in order to generate a target abstract object tree. Then the program instructions translate the target abstract object tree to a target file, wherein the target file includes the common portions between the original and new-release configurations and the merged upgrades of the customized and new-release configurations. These steps may be done automatically and be platform- and version-independent. Such an automatic process may reduce design engineers' and network administrators' time and effort for a cluster server software upgrade.

These and other embodiment are contemplated and will be appreciated upon reference to the following drawings and description.

Figure 1:
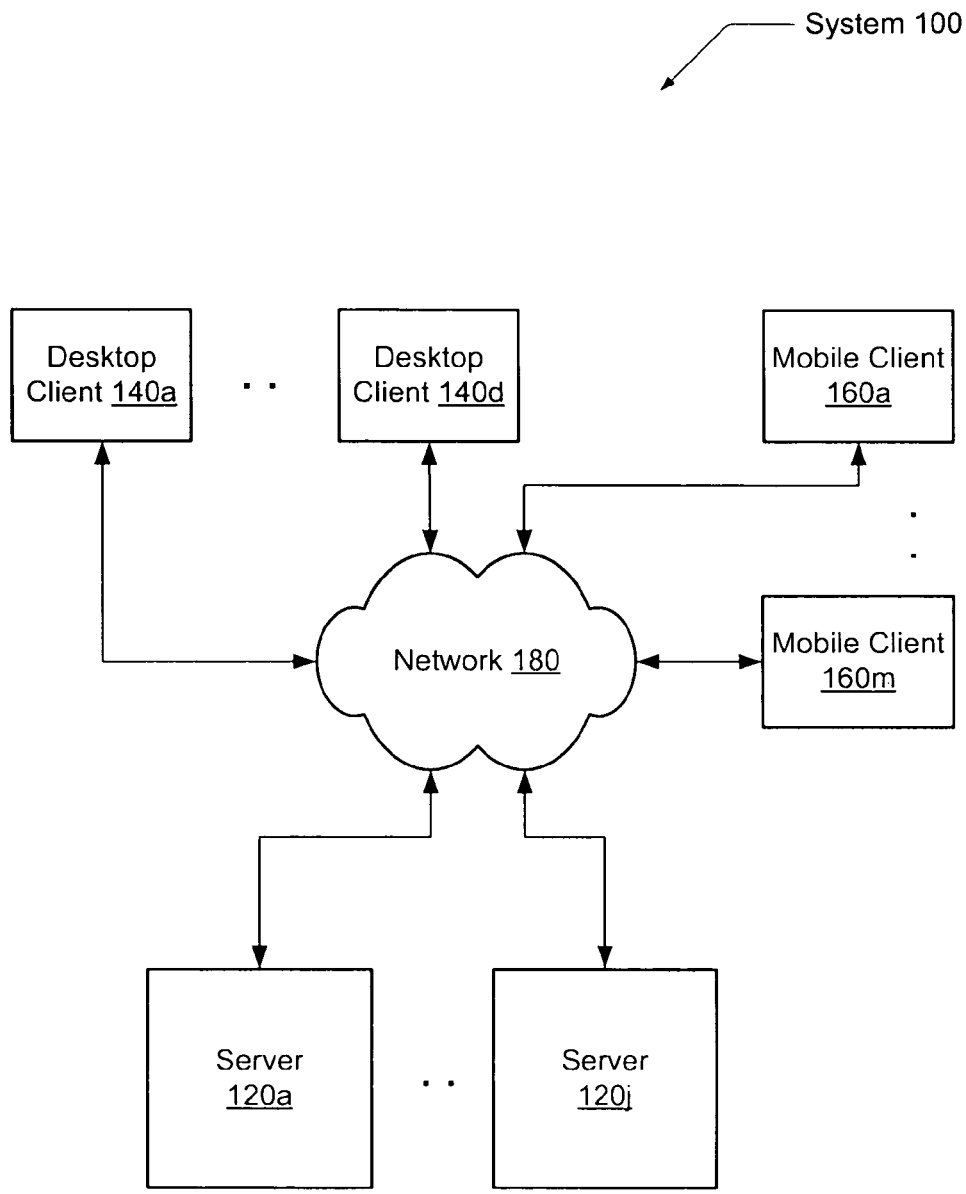
FIG. 1 is a block diagram illustrating one embodiment of a computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

Referring to FIG. 1, one embodiment of a computer system 100 is shown. In the example shown, any number and different types of clients may be coupled via a network 180. For example, one or more desktop clients 140a-140d may be included in computer system 100. As used herein, elements referred to by a reference numeral followed by a letter may be collectively referred to by the numeral alone. For example, desktop clients 140a-140d may be collectively referred to as desktop clients 140. Any type of stationary computing device, such as personal computers, workstations, etc., may be included in desktop clients 140. Similarly, mobile clients 160a-160m may comprise any type of mobile computing device such laptops, personal digital assistants (PDAs), wireless handheld devices, etc. Both desktop clients 140 and mobile clients 160 may be coupled to network 180 by a variety of techniques including wireless connection, direct local area network (LAN) connections, wide area network (WAN) connections such as the Internet, and others. Network 180 may comprise one or more LANs that may also be wireless. Network 180 may further include remote direct memory access (RDMA) hardware and/or software, transmission control protocol/internet protocol (TCP/IP) hardware and/or software, and/or others.

A server computer 120, or server 120, may be a computer designated for running a specific application or applications, often under heavy workloads, unattended, and for an extended amount of time. It is possible to utilize a workstation computer, such as a desktop client 140, to run server operating systems and server applications, a server 120 usually has features intended to make it more suitable for the applications. These features may include a faster processor or more processors, more and/or faster random-access memory (RAM), larger and redundant hard drives, higher reliability, redundant power supplies, modular design, rack or cabinet mountability, and so forth.

A server 120 designated for only one application may be named for that application. For example, a server 120 may include a computer with hardware and software optimized for an intended purpose of data storage. For example, large disk drives, powerful fans, specialized uninterruptible power supplies, and so on may be used. Such a server 120 may be named a file server. Alternatively, a server 120 may run an application for a business that includes transferring information on an intranet and/or the World Wide Web using a Hypertext Transfer Protocol (HTTP). Such a server 120 may be named a web server. Other examples are possible.

Server applications may be divided among servers 120 over an extreme range, depending upon the workload. Under light loading, every server application can run concurrently on a single server 120. Under heavy loading, multiple servers 120 may be required for each application. Under medium loading, one server 120 may be used for each server application, in order to limit the amount of damage caused by failure of any single server 120 or security breach of any single server application.

Each server 120 and a subset of the desktop clients 140 may be grouped into a node of a cluster. Computer clusters may be used to improve performance and/or availability over that provided by a single computer. High-availability clusters are implemented primarily to provide high availability for critical business applications and data through system redundancy and failover. For example, a cluster may have redundant nodes, which are then used to provide service when system components fail. Each application provided by a cluster utilizes resources of a cluster such as a memory (perhaps a harddrive), an Internet Protocol (IP) address, a network name, and so forth. These resources may be moved from one server to another during failover without any dependence on a specific server.

High-performance computing (HPC) clusters are used in supercomputers. For example, multiple computers may work in parallel to achieve a very high calculating capability. Unlike failover-clusters, HPC-clusters may not require shared disks, since they perform calculations the majority of the time and they may not need to read or write to common storage. If one of the machines in an HPC-cluster fails, then the cluster as a whole cannot calculate as fast, but none of the functionality is lost.

For any computer cluster (e.g. HAC, HPC, other), cluster server software is needed to allow servers and clients to work together, such as by, for example, automating failover procedures, managing the availability of applications services and data across local, regional and vastly dispersed nodes, and providing customer configurability through configuration files. The configuration files may be updated or customized by hard coding changes in a text editor or by a graphical user interface (GUI), sometimes referred to as a configuration wizard, for time saving efficiency. The configuration files include numerical assignments, pathname assignments, relation assignments, and other. Some examples of configurations described by these files may include cluster domain configuration, network time protocol configuration, and storage routing configuration, such as small computer system interface (SCSI) routing.

In order to perform the above features, the cluster server software may comprise processes, or agents, and a software engine. These agents are installed when the cluster software is installed. The agents may manage resources of predefined resource types according to commands received from the cluster software engine. Resources are parts of a system, such as a cluster, and are known by their type. Some examples may include a volume, a disk group, or an IP address. Resources may also have dependencies. A resource dependency exists when a first resource requires a second resource to be online or offline before the first resource can be online or offline. By way of example, a mount resource might depend on a volume resource.

The cluster software may include a set of resource types. Each resource type has a corresponding agent that controls the resource. A cluster node may have one agent per resource type that monitors all resources of that type. For example, a single IP agent manages all IP resources. When the agent starts, it obtains the necessary configuration information from the cluster software. The agent may then periodically monitor the resources, and update the cluster software with the resource status. In one embodiment, the resource types may be defined, by default, in a configuration file named "types" that is included in a "main" configuration file. In one embodiment, a collection of resources and their dependencies provide a service group. A failover protocol performed by the cluster software may occur at the service group level. This configuration may be stored in a "main" configuration file. Further details of the contents of a "main" configuration file are provided below subsequent a discussion of attributes.

Different attributes may define resource types in a "types" configuration file. An attribute's given value in the configuration file may configure the resource to function in a specific way. By modifying the value of a resource attribute, a user is able to change the manner in which the corresponding agent manages the resource. For example, the IP agent monitors an IP address resource. The agent uses the "Address" attribute to determine the IP address to monitor. The mount agent is responsible for mounting, unmounting, and monitoring the status of cluster software controlled file systems. Therefore, the mount agent needs to be aware of at least the device to mount ("BlockDevice" attribute) and the mount point (the aptly named "MountPoint" attribute).

A "main" configuration file may comprise "include" statements, or directives, in order for the cluster software to know which files contain the definitions of resources. These files may be configuration files also. For example, a "types" configuration file may be in an "include" statement and contain the definitions for the standard cluster software agents. Other non-standard agents may be bundled with a separate definition file. Examples of configuration file statements and their corresponding descriptions are provided below. However, the below statements are for illustrative purposes only. Syntax, statement names, values, and attributes may vary depending on the server software itself.

```
# more main.cf
include "types.cf"
cluster vcs_01 ( )
system camcs12 ( )
system camcs9 ( )
group MyServiceGroup (
    SystemList = { camcs9 = 0, camcs12 = 1, camcs13 = 2 }
    AutoStartList = { camcs9 }
)
Application MyApp (
    StartProgram = "/apps/MyApp/online"
    StopProgram = "/apps/MyApp/offline"
    CleanProgram = "/apps/MyApp/clean"
    MonitorProgram = "/apps/MyApp/monitor"
)
```

A "cluster" statement may provide for a corresponding node the name of the cluster that comprises the node. A "system" statement may determine for a corresponding cluster node or nodes which other systems are members of the same cluster. A "SystemList" attribute may determine which nodes of the corresponding cluster may activate a corresponding service group, and in what order the cluster software should attempt to failover. An "AutoStartList" attribute may define which nodes may automatically bring the service group online at the startup of the cluster software. If the AutoStartList contains more than one system, each system may first verify if the service is already online on another node in the cluster before attempting to bring the service group online locally.

A resource may begin with a resource type, such as the above "Application" statement. A user defined resource name ("MyApp") precedes an open-parentheses. Resource attributes may be read in until a close-parentheses is encountered. Each resource has a unique set of attributes. Both required and available attributes depend on the cluster software. For example, in one embodiment, a list of attributes for the Veritas Cluster Server software may be found in the Veritas Storage Foundation™ HA 4.1 for Windows, Veritas Cluster Server Bundled Agents Reference Guide, May 2004.

An example of a general outline of a "main" configuration file, which may be named types.cf, is provided below:

```
Include A.cf
Include B.cf
Type C {
    Attribute E
    Attribute F
}
Type D { }
```

An example of a "main" configuration file with more detail, which may be named types.cf, is provided below:

```
include "DNStypes.cf"
include "HTCTypes.cf"
type Application (
    static str ArgList[ ] = { User, StartProgram, StopProgram,
                              CleanProgram, MonitorProgram, PidFiles,
                              MonitorProcesses }
    str User
    str StartProgram
)
type FileOnOff (
    static str ArgList[ ] = { PathName }
    str PathName
)
type IP (
    static keylist SupportedActions = { "device.vfd", "route.vfd" }
    static str ArgList[ ] = { Device, Address, NetMask, Options }
    str Device
    str Address
    str NetMask
    str Options
)
```

Figure 2:
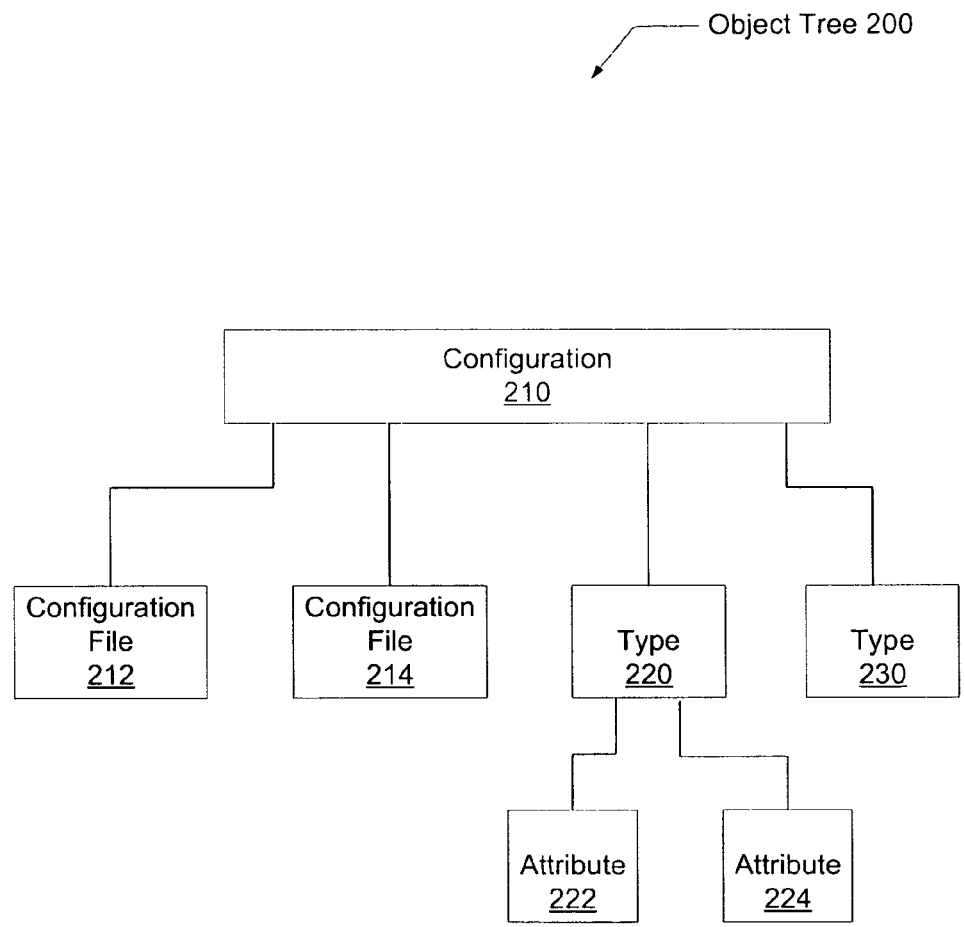
FIG. 2 is a block diagram illustrating one embodiment of an object tree.

The above outline is a broader example of a configuration description that follows a similar format as to the previous example. Referring now to FIG. 2, one embodiment of an abstract object oriented tree 200 representation of the above file format is shown. An object tree may have the following objects: a tree root, a branch, and a node. The tree root, which is the first level of the tree, is configuration 210. In one embodiment, the configuration 210 may represent a "main" configuration file to be used by cluster software.

A second level of the tree, a branch, can abstractly assign a list of types, resources, groups, systems, clusters or even relationships between the objects. A representation of the second level is shown by the configuration files 212 and 214, which may be arguments of include directives, and types 220 and 230. A third level, a node, may define a type, a resource, a group, a system or a cluster object, a relationship object between any two objects, or even an attribute list.

As stated above, the configuration files may be edited by a user, such as a customer with administrative user access. The user may perform hard coding changes in a text editor, execute commands on a command line, or edit with the use of a GUI. Dynamic modifications of the configuration files, and thus the configuration of the resources managed by an agent, is possible and desired by the customer. In order to implement any changes, the cluster software may need to be restarted. Therefore, the current customized configuration contains differences with the original configuration of the cluster software. These differences are modifications in the configuration files in the form of lines in the files that have been added, deleted, or modified.

For new release versions of the cluster software, the new configuration comprises new configuration files. The new configuration files contain differences with the original configuration of the cluster software. These differences are modifications in the configuration files in the form of lines in the files that have been added, deleted, or modified. Thus, prior to an upgrade, there are differences between the original configuration and the customized configuration and differences between the new configuration and the original configuration. The customizations need to be reserved in order to maintain a stable system after the upgrade. The upgrade may be a manual process involving hard coding of incremental changes to the previous installer scripts to account for platform and version change lists. A more efficient manner may involve an automatic process that greatly reduces engineering effort during the upgrade.

Rather than edit the files manually, an automatic upgrade may be performed by first translating a configuration to an abstract object tree as shown in FIG. 2. If the original configuration, customized configuration, and new configuration are all represented by an object tree, then abstract operations may be performed on the corresponding trees to create a resulting configuration. This resulting configuration may comprise the new configuration and the customizations performed on the original configuration. The abstract operations may be automated, platform-independent, and version-independent.

In one embodiment, in order to represent the configurations as trees, an intermediate step of translating the configuration files to a command list may be performed. For example, a command list for the above general outline of a "main" configuration file may include the following:
    hatype—add C
    hatype—add D
    haattr—add C E
    haatrr—add C F An example of a command list for a "main" configuration file, such as types.cf, with more detail is provided below:
    hatype—add FileOnOff
    hatype—modify FileOnOff SourceFile "./types.cf"
    hatype—modify FileOnOff ArgList PathName
    haattr—add FileOnOff PathName—string
    hatype—add Application
    hatype—modify Application SourceFile "./types.cf"
    hatype—modify Application SupportedActions program-.vfd user.vfd cksum.vfd getcksum
    hatype—modify Application ArgList User StartProgram StopProgram CleanProgram MonitorProgram PidFiles MonitorProcesses
      haattr—add Application User—string
      haattr—add Application StartProgram—string A software tool may be utilized to perform the translations. Afterwards, a second software tool, or parser, may translate the intermediate commands to a hash table based on objects such as trees, branches, nodes, and commands. Now all the flat data of the configuration files with complex internal relations are reorganized as data objects. It may be now possible to find, delete, add, and/or update any type, resource, group, cluster, system, ink relationship, or even an attribute based on the abstract object tree. Abstract operations between the trees may need to be utilized, which is further discussed later.

Figure 3:
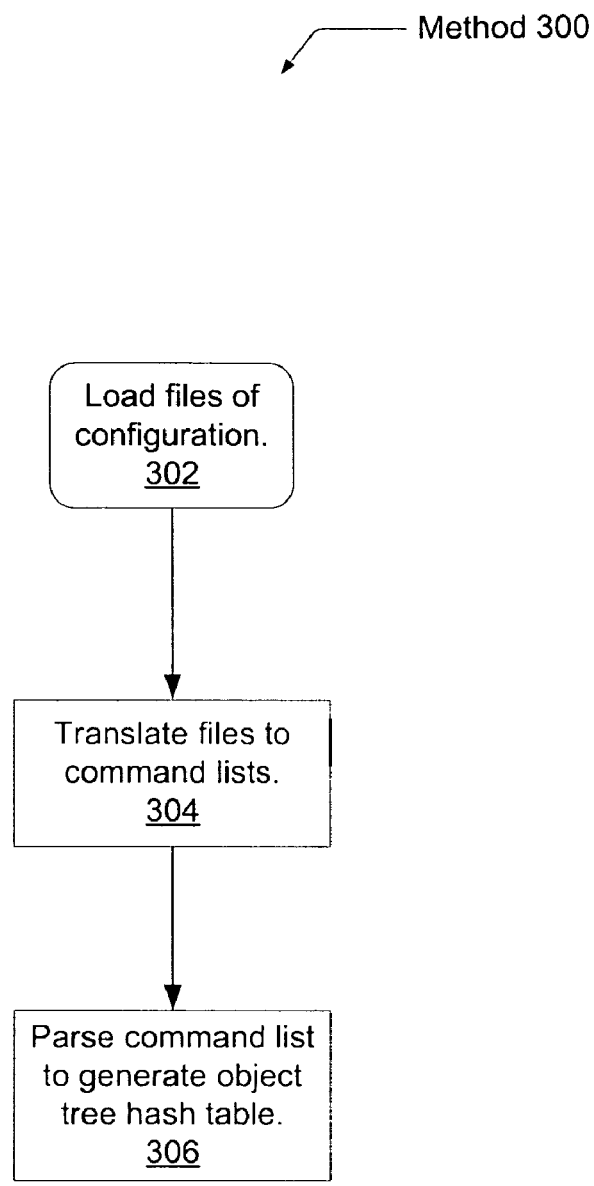
FIG. 3 is a flow diagram illustrating one embodiment of a method for converting a configuration to an abstract object tree.

Turning now to FIG. 3, one embodiment of a method 300 for converting a configuration to an abstract object tree is illustrated. For purposes of discussion, the steps in this embodiment are shown in sequential order. However, some steps may occur in a different order than shown, some steps may be performed concurrently, some steps may be combined with other steps, and some steps may be absent in another embodiment. The necessary configurations files are loaded in block 302. An intermediate step in block 304 translates the files to a command list. The commands in this list create a part of an object. Any object tree node is represented by a group of command objects. Then in block 306, the command list is parsed and a hash table is created describing the objects of trees, branches, nodes, and commands of the configuration. In one embodiment, the above steps may be included in the installer scripts, which may be implemented in Perl or another scripting language.

Next, a series of abstract operations may be defined and utilized between the trees to obtain a desired resulting configuration for the upgrade. In one embodiment, the general operations may include Add-To, Add-From, Minus, Intersect, Change-Priority, and Save-From. Descriptions of these operations follow.

Figure 4A:
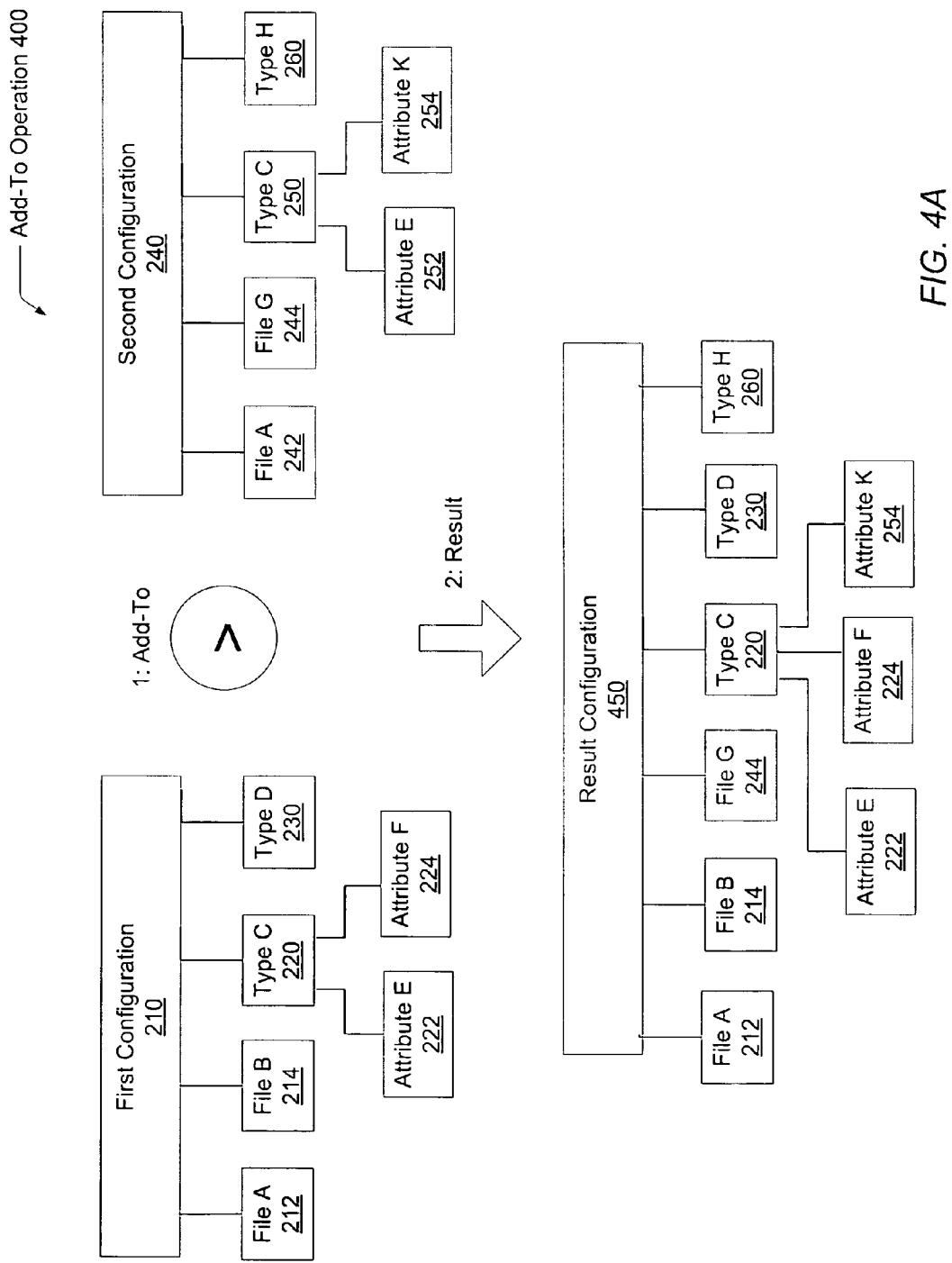
FIG. 4A is a block diagram illustrating one embodiment of an abstract Add-To operation between two object trees.

For the Add-To operation between a first object tree and a second object tree, the action of the operation adds the objects of the first tree to the second tree. Any similar objects between the two trees are overwritten in the second tree by the object in the first tree. FIG. 4A illustrates one embodiment of the Add-To operation 400 between two object trees. Object portions that correspond to those of FIG. 2 are numbered identically. In step 1, an Add-To operation may be performed between two configurations, first configuration 210 and second configuration 240, both represented as abstract object trees. The second configuration 240 has a similar file A 242 as file A 212 of the first configuration. File A 242 may be a similar configuration file to file A 212, but one of these two files may contain modifications, such as customizations or upgrades. In one embodiment, the similarity between corresponding objects may be detected by a same filename, type name, or other name. In other embodiments, another means may be used to detect similar objects. File G 244 is a part of the second configuration 240, but has no corresponding file in the first configuration 210. Type C 250 of the second configuration 240 is similar to Type C 220 of the first configuration 210. However, Type C 250 only has one similar, or corresponding, attribute, attribute E 252. Type C 250 does not comprise a corresponding attribute to attribute F 224, but does comprise an additional attribute, attribute K 254. Type H 260 is an additional type in the second configuration 240 and it does not have a corresponding type in the first configuration 210.

In step 2, the result may be computed to generate a result configuration 450. Here, the uncommon objects of the second configuration 240 are included such as file G 244 and type H 260. The uncommon objects of the first configuration 210 are written to the result configuration 450 and these include file B 214 and type D 230. The common objects of the second configuration 240 with the first configuration 210 are overwritten by these common corresponding objects in the first configuration 210. For example, file A 242 is common with file A 212 and it is overwritten by file A 212. Similarly, type C 250 is overwritten by type C 220. Correspondingly, attribute E 252 is overwritten by attribute E 222. Attribute F 224 is added to the result configuration 450 and attribute K 254 is maintained from the second configuration 240.

Figure 4B:
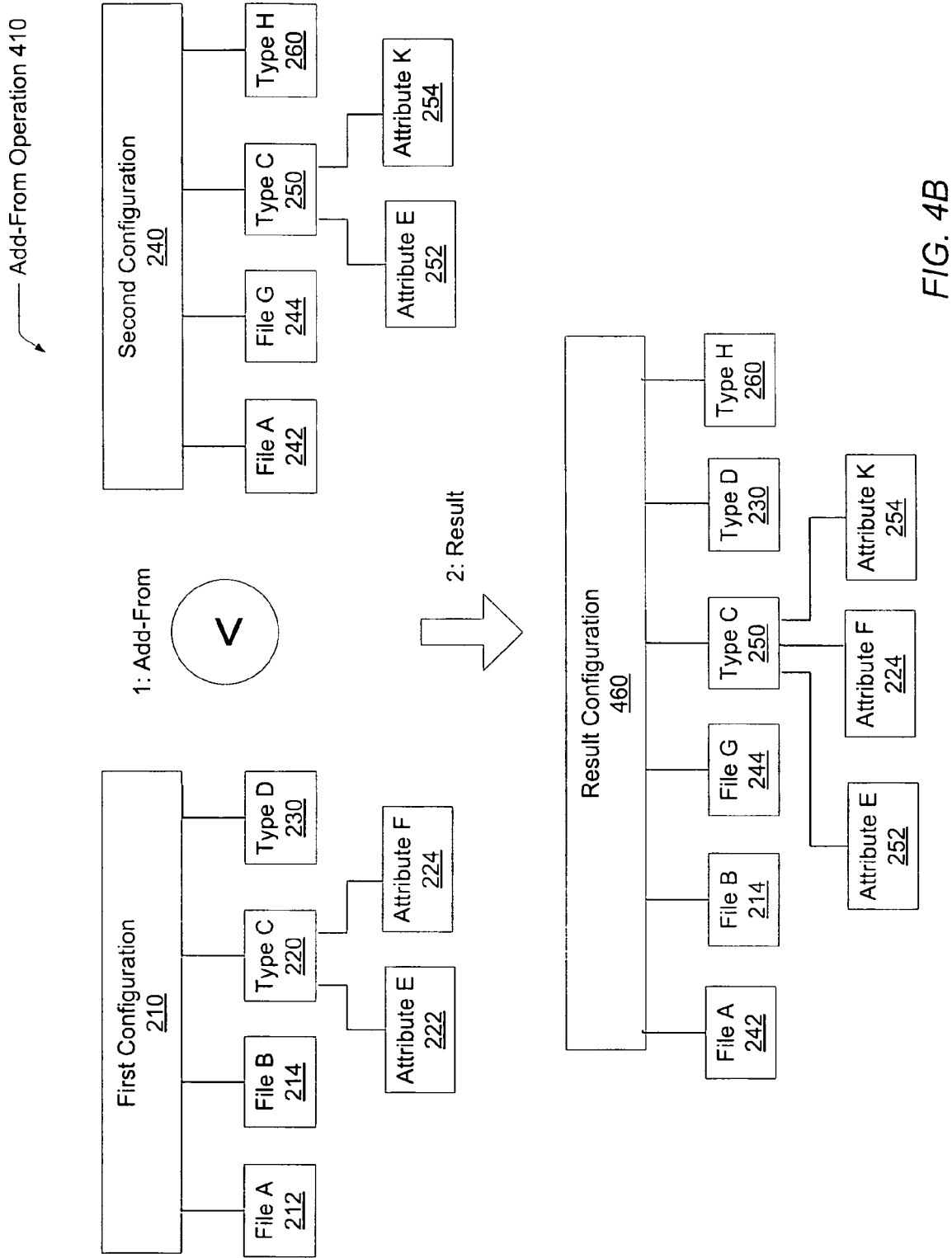
FIG. 4B is a block diagram illustrating one embodiment of an abstract Add-From operation between two object trees.

FIG. 4B illustrates one embodiment of the Add-From operation 410 between two object trees. The two configurations 210 and 240 are shown again for illustrative purposes. Here, in step 1, an Add-From operation may be performed between two configurations 210 and 240, both represented as abstract object trees. In step 2, a result may be computed to generate a result configuration 460. Here, the uncommon objects of the first configuration 210 are included such as file B 214 and type D 230. The uncommon objects of the second configuration 240 are written to the result configuration 460 and these include file G 244 and type H 260. The common objects of the first configuration 210 with the second configuration 240 are overwritten by the common corresponding objects in the second configuration 240. For example, file A 212 is common with file A 242 and it is overwritten by file A 242. Similarly, type C 220 is overwritten by type C 250. Correspondingly, attribute E 222 is overwritten by attribute E 252. Attribute K 254 is added to the result configuration 460 and attribute F 224 is maintained from the second configuration 240.

Figure 4C:
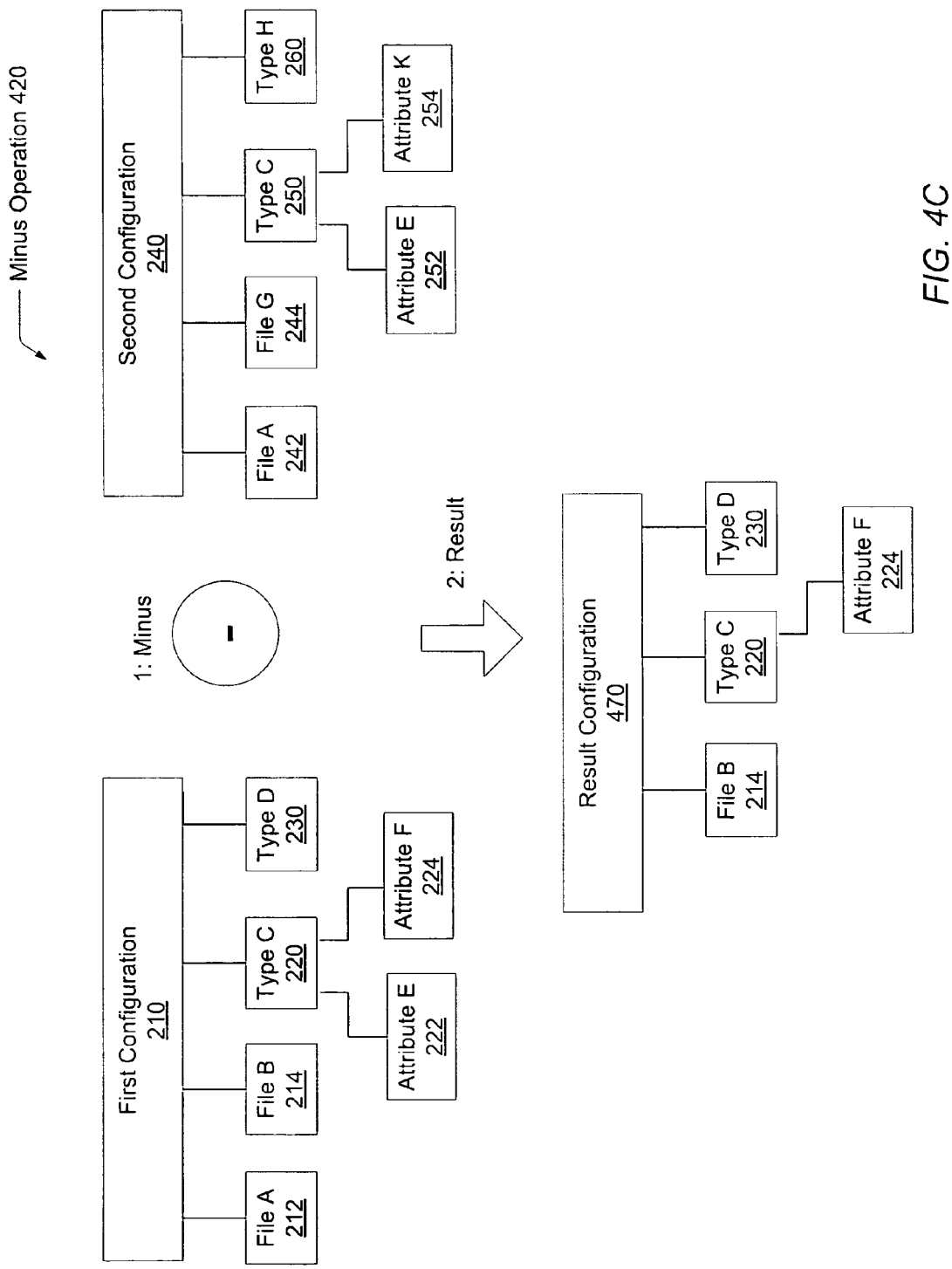
FIG. 4C is a block diagram illustrating one embodiment of an abstract Minus operation between two object trees.

Turning now to FIG. 4C, one embodiment of the Minus operation 420 between two object trees is shown. The same two configurations 210 and 240 as discussed above are represented as abstract object trees. In step 1, a Minus operation may be performed between the two configurations 210 and 240. In step 2, a result may be computed to generate a result configuration 470, wherein uncommon objects between the configurations 210 and 240 that are included within the first configuration 210 are maintained or included in result configuration 470. Uncommon objects among configurations 210 and 240 that are included in the second configuration 240 are not included in result configuration 470. The common objects among the first configuration 210 and the second configuration 240 are also not included in the result configuration 470. Here, the uncommon objects of the first configuration 210 placed in the result configuration 470 include file B 214, type C 220, attribute F 224, and type D 230.

The determination of objects, such as files, types, attributes, or other, as common or uncommon may depend on the characteristics of the objects. For example, in one embodiment, a first file may be determined to be an uncommon object with respect to a second file if the first file and the second file have different names. Otherwise, the first and second files may be determined to be common objects if the first and second files have a same name. A first type may be determined to be an uncommon object with respect to a second type if the first and second types have different names. Also, a first type may be determined to be an uncommon object with respect to a second type if the first and second types have a same name, but there is at least one attribute among the first and second types that is determined to be an uncommon object. Further details regarding this determination follows shortly. A first type may be determined to be a common object with respect to a second type if the first and second types have a same name, and either the first and second types comprise no attributes or all attributes among the first and second types are determined to be common objects.

An attribute may have a corresponding name and a corresponding value. Further, a first attribute may be determined to be an uncommon object with respect to a second attribute if the first attribute has a different name than the second attribute. Also, a first attribute may be determined to be an uncommon object with reference to a second attribute if the first attribute has a same name as the second attribute, but the first attribute has a different value than the second attribute. For example, a first attribute may have a name "PathName1" and a string indicating a value for "PathName1" such as "\\server1\office". A second attribute may have a same name, "PathName1", as the first attribute but have a different string indicating a value such as "\\server1\corp". Finally, a first attribute and a second attribute may be determined to be common objects if they have a same name and a same value. In alternative embodiments, a different method may be utilized for distinguishing common objects from uncommon objects with regard to files, types, attributes, or other.

Still referring to FIG. 4C, as stated above, the objects within the second configuration 240 determined to be uncommon objects with respect to the first configuration 210 are not included in the result configuration 470. Also, all objects determined to be common objects among the first and second configurations 210 and 240 are not included in the result configuration 470. For example, file A 212 and file A 242 may be determined to be common objects, due to same names or other method, among configurations 210 and 240. Accordingly, they are not included in the result configuration 470. File B may be determined to be an uncommon object among configurations 210 and 240, due to no same names or other method, and it is included in configuration 470. File G 244 may be determined to be an uncommon object among configurations 210 and 240, but it is part of the second configuration 240 and it is not part of the first configuration 210. Therefore, file G 244 is not included in configuration 470.

Attribute E 222 and attribute E 252 may be determined to be common objects, since they may have a same name and a same value. Therefore, attribute E 222 and attribute E 252 are not included in configuration 470. On a side note, if attribute E 222 and attribute E 252 are determined to be uncommon objects, because, for example, they have a same name, but different values, then only attribute E 222 may be included in configuration 470. Attribute F 224 may be determined to be an uncommon object among configurations 210 and 240 since no attribute in configuration 240 has a same name. Since attribute F 224 is included in configuration 210, it may be included in result configuration 470.

Type C 220 may be determined to be an uncommon object among configurations 210 and 240 since it has a same name with type C 250, but it also has an attribute determined to be an uncommon object (attribute F 224). Since type C 220 is included in configuration 210, it is also included in result configuration 470 along with attribute F 224. Type C 250 may be determined to be an uncommon object due to having a same name with type C 220, but comprising an uncommon object (attribute K 254). However, type C 250 and attribute K 254 are included in the second configuration 240, and accordingly, they are not included in result configuration 470. Type D 230 may be determined to be an uncommon object due to not having a same name with any types in the second configuration 240. Since type D 230 is included in the first configuration 210, it may also be included in the result configuration 470. Although type H 260 may be determined to be an uncommon object since it does not have a same name with any types in the first configuration 210, it is not included in the result configuration 470. This may be due to type H 260 is included in the second configuration 240 and not the first configuration 210.

Figure 4D:
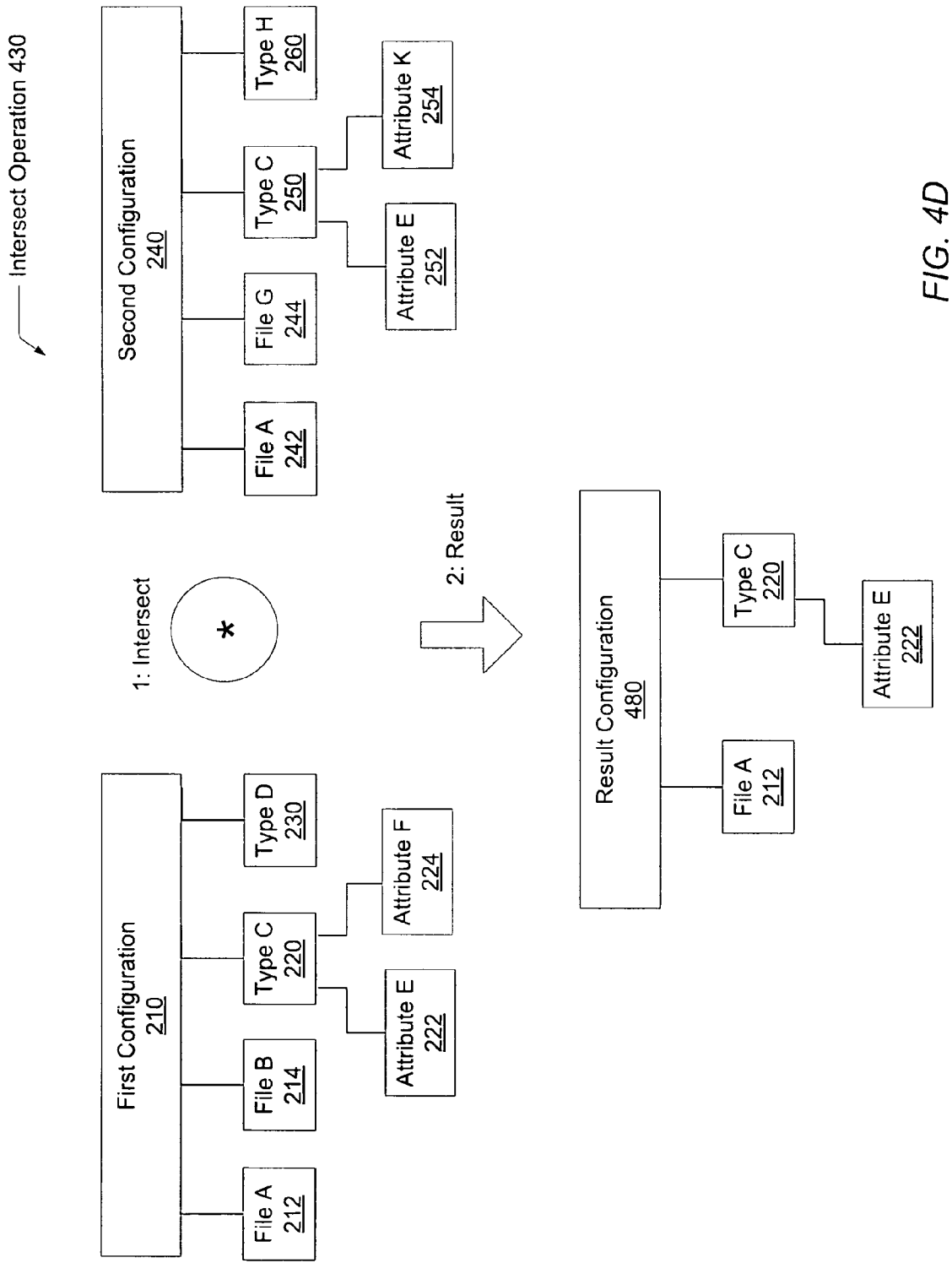
FIG. 4D is a block diagram illustrating one embodiment of an abstract Intersect operation between two object trees.

Turning now to FIG. 4D, one embodiment of the Intersect operation 430 between two object trees is shown. The same two configurations 210 and 240 as discussed above are represented as abstract object trees. In step 1, an Intersect operation may be performed between the two configurations 210 and 240. In step 2, a result may be computed to generate a result configuration 480. In one embodiment, a method for determined common and uncommon objects among files, types, attributes, or other, may be the same as the method described above regarding FIG. 4C and the Minus operation. Here, the uncommon objects of the configurations 210 and 240 are not included such as file B 214, file G 244, type D 230, and type H 260. Also, the common objects of the second configuration 240 with respect to the first configuration 210, such as file A 242, type C 250, and attribute E 252 are not included in result configuration 480. However, the common objects of the first configuration 210 with respect to the second configuration 240, such as file A 212, type C 220, and attribute E 222 are included in result configuration 480.

Once a result configuration is generated using the above described abstract operations, a combination of these operations, or other derived operations, the result configuration needs to be translated from an abstract object tree to the syntax and format of configuration files. In one embodiment, an intermediate step may be included that translates a result object tree format to a command list (i.e. hatype, haattr, etc). Then the command list is translated to a desired configuration file format. The Save-From operation may be utilized to overwrite the original configuration command list with the translation from the result object tree. Alternatively, the Save-From operation may write a separate configuration command list in order to maintain a copy of the original configuration command list.

Examples of the corresponding symbols for the abstract operations are shown in FIG. 4A-4D. Other symbols may have been chosen. The symbols may be used to represent abstract operation expressions. For example, if a symbol for the Save-From operation is chosen to be an equal sign, "=", then an expression for FIG. 4A may be described as Result=First Configuration>Second Configuration. An expression for FIG. 4D may be described as Result=First Configuration*Second Configuration, and so forth.

If the abstract expressions become more complex, a priority scheme may be needed to ensure the abstract operations are performed in a desired order. For example, an expression may be described as Result=Third Configuration<First Configuration*Second Configuration. In this case, it may not be clear if the Add-From operation (<) or the Intersect operation (*) should be performed first. If a left-to-right methodology is adapted, then the Add-From operation is performed first. In order to change the priority order, the expression may need to be rewritten. Alternatively, a Change-Priority operation described with parentheses may set the priority order within an expression. Then the above expression may be described as Result=Third Configuration<(First Configuration*Second Configuration). Now the Intersect operation is performed before the Add-From operation.

For the example above, a Third Configuration 290, which is not shown but described here, may comprise a File A 262, File M 264, Type N 270 with Attribute P 272 and Attribute Q 274, and Type O 280. The result of the expression for Result=Third Configuration 290<(First Configuration 210*Second Configuration 240) would be File A 212, File M 264, Type N 270 with Attribute P 272 and Attribute Q 274, Type O 280, and Type C 220 with Attribute E 222.

It is noted the operations described in FIG. 4A-4D are not totally encompassing. In other embodiments, further operations may be derived and these additional operations may take only one or may take more than two configurations as inputs.

In order to automatically create an Upgrade Target Configuration complete with upgrade modifications from the New Configuration to the Original Configuration files and with customization modifications from the Customized Configuration, the three configurations may be first translated to corresponding object tree representations. Then the following abstract expression may be required to describe the steps to create the target: Upgrade Target Configuration=(Customized Configuration−Original Configuration)>New Configuration. In this manner, it may be possible to automatically find the utilized platforms, find version differences, find the customized changes, and merge version differences and customized changes into the new version. Here, only one unique upgrade framework may be necessary to handle all platforms, all product versions, and additional possible future requirements.

An example of finding the Upgrade Target Configuration with abstract object trees and operations includes the first configuration 210 as an original configuration, the second configuration 240 as the customized configuration, and the third configuration as the new-release configuration. Therefore, the result of the expression for Upgrade Target Configuration=(Second Configuration 240−First Configuration 210)>Third Configuration 290 would be File A 262, File G 244, File M 264, Type H 260, Type N 270 with Attribute P 272 and Attribute Q 274, Type C 250 with attribute E 252, and Type O 280.

Figure 5:
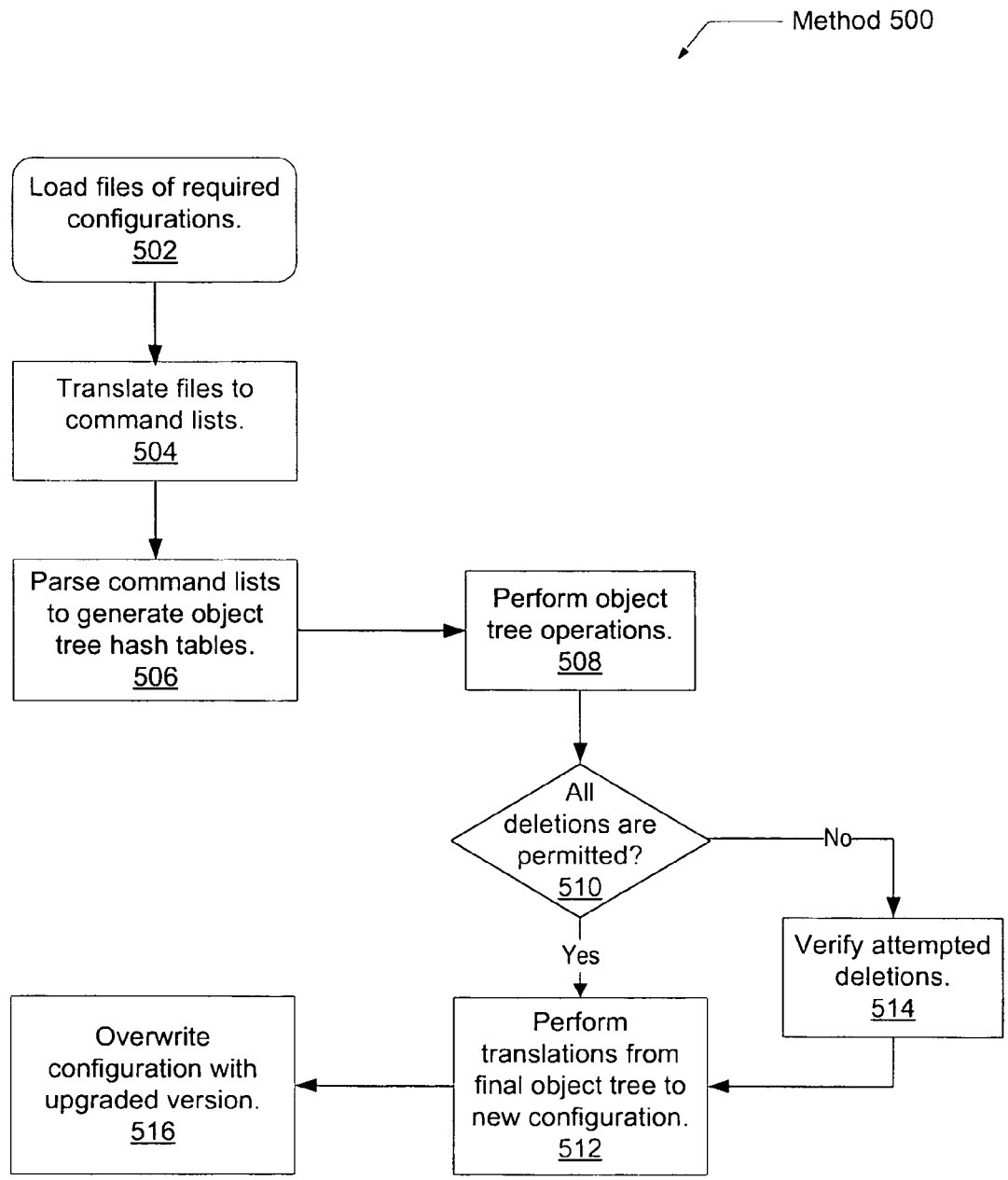
FIG. 5 is a flow diagram illustrating one embodiment of a method for a software upgrade utilizing dynamic configuration data manipulation and merging.

FIG. 5 is one embodiment of a method 500 for a software upgrade utilizing dynamic configuration data manipulation and merging. For purposes of discussion, the steps in this embodiment are shown in sequential order. However, some steps may occur in a different order than shown, some steps may be performed concurrently, some steps may be combined with other steps, and some steps may be absent in another embodiment. In one embodiment, the below steps may be included in the installer scripts for a cluster server software product, which may be implemented in Perl or another scripting language. The installer scripts may be stored on a DVD-ROM, within a module of the cluster software on a hard disk, or other computer readable medium.

The necessary configurations files are loaded in block 502. In one embodiment, there may be configuration files from three configurations to load. For example, there may be an Original Configuration, a Customized Configuration that contains customizations to the files performed by a customer, and a New Configuration that contains new-release modifications to the configuration files of the Original Configuration. In other embodiments, there may be less or more configurations to load, or there may be three configurations with different characteristics than the ones just described.

In block 504, a translation occurs that converts the loaded configurations to corresponding command lists. The commands in these lists create a part of an abstract object used in an abstract object tree. Any object tree node is represented by a group of command objects. Then in block 506, each command list is parsed and a hash table is created describing the objects of trees, branches, nodes, and commands of the corresponding configuration. In another embodiment, the actions of block 504 may be removed and a parsing in block 506 may create object tree hash tables without the aid of an intermediate step.

A series of abstract operations may be utilized between the generated trees to obtain a desired resulting configuration for the upgrade in block 508. In one embodiment, the general operations may include operations discussed above regarding FIG. 4A-4D such as Add-To, Add-From, Minus, Intersect, Change-Priority, and Save-From. In other embodiments, other operations may be derived in order to create a final result configuration to be the Upgrade Target Configuration. In one embodiment, the following abstract expression may be utilized to create the final resulting configuration: Upgrade Target Configuration=(Customized Configuration−Original Configuration)>New Configuration. The final configuration, Upgrade Target Configuration, may include all the utilized platforms in the Original Configuration, include version differences between the New and Original configurations, and include the customized changes between the Customized and Original configurations.

Although the actions in block 508 may be automatic and require no intervention by a user, it may be desired for the user to be aware of what lines of the configuration files or characteristics of the files are being removed. If the calculated deletions by the abstract operations are not automatically permitted (conditional block 510), then a verification by the user may occur in block 514. The user may choose what configuration traits are deleted and what traits are kept. Control flow then proceeds to block 512. If the calculated deletions by the abstract operations are automatically permitted (conditional block 510), control flow of method 500 proceeds to block 512.

Once the abstract operations produce a result configuration, this result configuration may be translated from an abstract object tree to the syntax and format of configuration files in block 512. In one embodiment, an intermediate step may be included that translates a result object tree format to a command list. Then the command list is translated to a desired configuration file format. In one embodiment, the actions of block 512 may be automatic. In other embodiments, a user interface, such as a GUI or other, may allow the user to interact with the process in order to direct or ensure the steps adhere to the format and syntax of the configuration files. Finally, the current configuration is overwritten by the upgraded configuration in block 516.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for upgrading a cluster computing system, the method comprising:
   identifying a first file and a second file, wherein the first file and the second file are configuration files for the cluster computing system, and wherein the second file comprises a first common portion and a first updated portion with respect to the first file;
   identifying a third file, wherein the third file is a configuration file for the cluster computing system, and wherein the third file comprises a second common portion and a second updated portion with respect to the first file;
   translating each of the first file, the second file, and the third file to separate respective abstract object trees;
   performing a series of abstract operations on the abstract object trees in order to generate a target abstract object tree, wherein said abstract operations are selected from the group consisting of: Add-To, Add-From, Minus, Intersect, Change-Priority, and Save-From; and
   translating the target abstract object tree to a target file, wherein the target file is a configuration file for the cluster computing system, and wherein the target file comprises the second common portion, the second updated portion, and the first updated portion, wherein the target file is generated automatically subsequent to performing said series of abstract operations.

2. The method of claim 1, further comprising characterizing an old computing system configuration with the first file and characterizing a new-release computing system configuration with the third file.

3. The method of claim 2, further comprising characterizing a customized old computing system configuration with the second file.

4. The method of claim 3, wherein the generation of the target file is platform and version independent and maintains all internal relations within the first file, the second file, and the third file.

5. The method of claim 1, further comprising using a Minus abstract operation to produce a temporary abstract object tree from the first abstract object tree and the second abstract object tree, the temporary abstract object tree comprising only objects representing the first updated portion.

6. The method of claim 5, further comprising using an Add-To abstract operation to produce the target abstract object tree from the temporary abstract object tree and the third abstract object tree.

7. A non-transitory computer readable storage medium comprising program instructions which are executable to:
   identify a first file and a second file, wherein the first file and the second file are configuration files for the cluster computing system, and wherein the second file comprises a first common portion and a first updated portion with respect to the first file;
   identify a third file, wherein the third file is a configuration file for the cluster computing system, and wherein the third file comprises a second common portion and a second updated portion with respect to the first file;
   translate each of the first file, the second file, and the third file to separate respective abstract object trees;
   perform a series of abstract operations on the abstract object trees in order to generate a target abstract object tree, wherein said abstract operations are selected from the group consisting of: Add-To, Add-From, Minus, Intersect, Change-Priority, and Save-From; and
   translate the target abstract object tree to a target file, wherein the target file is a configuration file for the cluster computing system, and wherein the target file comprises the second common portion, the second updated portion, and the first updated portion, wherein the target file is generated automatically subsequent to performing said series of abstract operation.

8. The storage medium of claim 7, wherein the instructions are further executable to characterize an old computing system configuration with the first file and characterize a new-release computing system configuration with the third file.

9. The storage medium of claim 8, wherein the instructions are further executable to characterize a customized old computing system configuration with the second file.

10. The storage medium of claim 9, wherein the generation of the target file is platform and version independent and maintains all internal relations within the first file, the second file, and the third file.

11. The storage medium of claim 7, wherein the instructions are further executable to use a Minus abstract operation to produce a temporary abstract object tree from the first abstract object tree and the second abstract object tree, the temporary abstract object tree comprising only objects representing the first updated portion via a Minus abstract operation.

12. The storage medium of claim 11, wherein the instructions are further executable to use an Add-To abstract operation to produce the target abstract object tree from the temporary abstract object tree and the third abstract object tree.

13. The storage medium of claim 12, wherein the instructions are further executable to increase the number of predetermined abstract operations in response to determining the generation of the target file requires more than the first file, the second file, and the third file.

14. A computing system comprising:
one or more clients coupled to a network;
a server coupled to the network;
wherein the server is configured to:
identify a first file and a second file, wherein the first file and the second file are configuration files for the cluster computing system, and wherein the second file comprises a first common portion and a first updated portion with respect to the first file;
identify a third file, wherein the third file is a configuration file for the cluster computing system, and wherein the third file comprises a second common portion and a second updated portion with respect to the first file;
translate each of the first file, the second file, and the third file to separate respective abstract object trees;
perform a series of abstract operations on the abstract object trees in order to generate a target abstract object tree, wherein said abstract operations are selected from the group consisting of: Add-To, Add-From, Minus, Intersect, Change-Priority, and Save-From; and
translate the target abstract object tree to a target file, wherein the target file is a configuration file for the cluster computing system, and wherein the target file comprises the second common portion, the second updated portion, and the first updated portion, wherein the target file is generated automatically subsequent to performing said series of abstract operations.

15. The computing system of claim 14, wherein the server is further configured to characterize an old computing system configuration with the first file, characterize a customized old computing system configuration with the second file, and characterize a new-release computing system configuration with the third file.

16. The computing system of claim 15, wherein the server is further configured to use a Minus abstract operation to produce a temporary abstract object tree from the first abstract object tree and the second abstract object tree, the temporary abstract object tree comprising only objects representing the first updated portion via a Minus abstract operation.

17. The computing system of claim 16, wherein the server is further configured to use an Add-To abstract operation to produce the target abstract object tree from the temporary abstract object tree and the third abstract object tree.

* * * * *

UNITED STATES PATENT AND TRADEMARK OFFICE
CERTIFICATE OF CORRECTION

PATENT NO. : 8,291,403 B2
APPLICATION NO. : 12/164789
DATED : October 16, 2012
INVENTOR(S) : Li et al.

It is certified that error appears in the above-identified patent and that said Letters Patent is hereby corrected as shown below:

On the Title Page

Item (73) the Assignee is incorrect, please change "Symantec Operating Corporation" to "Symantec Corporation".

Signed and Sealed this
Twenty-third Day of April, 2013

Teresa Stanek Rea
*Acting Director of the United States Patent and Trademark Office*